United States Patent

Muka

[15] 3,650,447
[45] Mar. 21, 1972

[54] LOOP CONTROL DEVICE

[72] Inventor: Edward Muka, Rochester, N.Y.

[73] Assignee: Eastman Kodak Company, Rochester, N.Y.

[22] Filed: May 19, 1970

[21] Appl. No.: 38,716

[52] U.S. Cl............................226/34, 226/45, 226/113, 226/175, 226/191
[51] Int. Cl.......................................................B65h 23/18
[58] Field of Search................226/34, 40, 42, 175, 178, 191, 226/97, 45, 113

[56] References Cited

UNITED STATES PATENTS

| | | | |
|---|---|---|---|
| 2,341,636 | 2/1944 | Luehrs | 226/175 |
| 2,945,637 | 7/1960 | Derrick | 226/97 UX |

FOREIGN PATENTS OR APPLICATIONS

| | | | |
|---|---|---|---|
| B26,081 | 8/1956 | Germany | 226/175 |

Primary Examiner—Richard A. Schacher
Attorney—W. H. J. Kline, P. R. Holmes and L. F. Seebach

[57] ABSTRACT

A drive system that normally moves a web of material at a generally constant linear speed includes a device for controlling the size of a loop formed by the web as it is moved through a preselected path. The sensing orifice of a flapper amplifier is positioned relative to the loop and in a preset spaced relation to a surface of the web. Any change in this spaced relation due to a change in the loop size causes the bellows of the amplifier, through an appropriate linkage, to exert a force on a drive control roller having a variable effective diameter. As the roller diameter changes, the linear speed of the web changes and the normal linear speed is attained when the preset spaced relation between the web and sensing orifice is restored.

8 Claims, 7 Drawing Figures

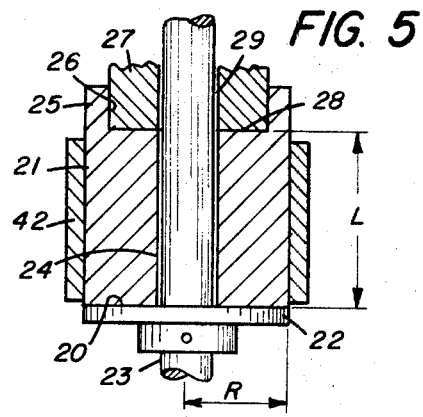
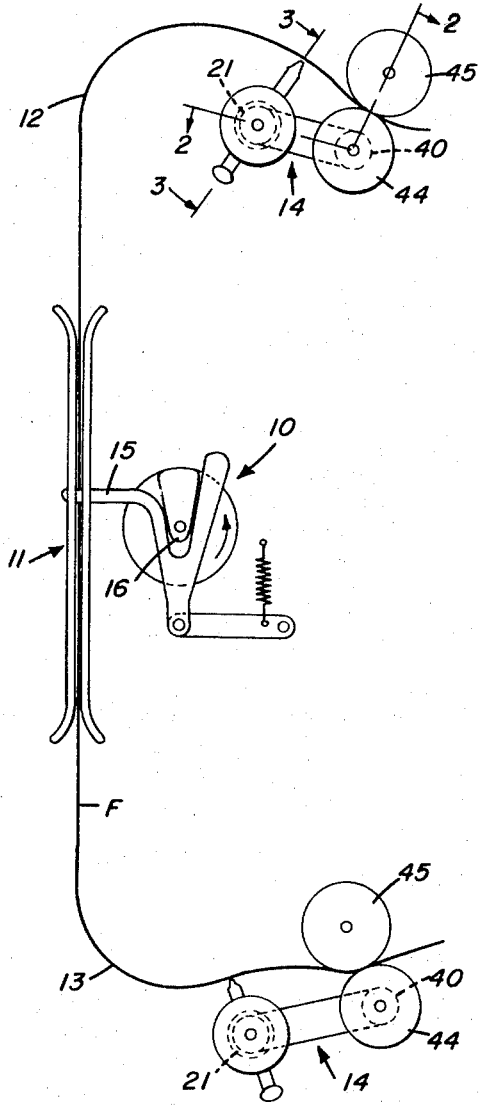
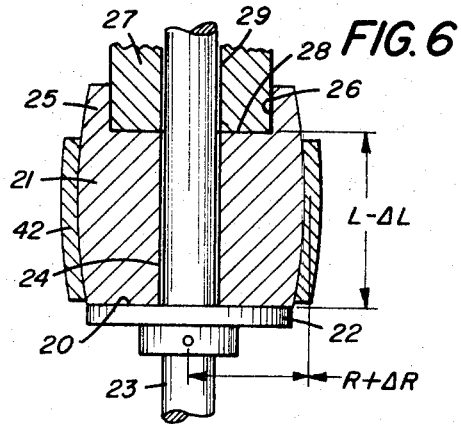
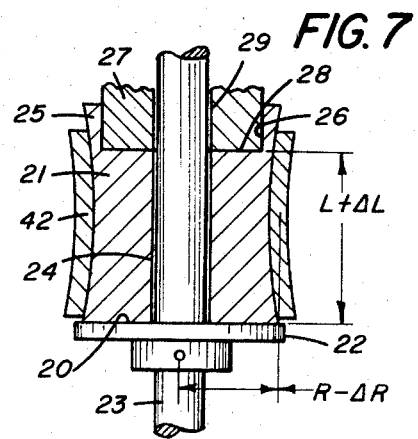
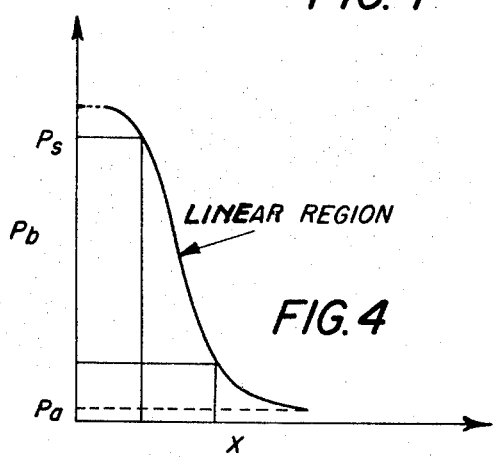
EDWARD MUKA
INVENTOR.
AGENT

EDWARD MUKA
INVENTOR.

3,650,447

LOOP CONTROL DEVICE

FIELD OF THE INVENTION

The present invention relates to apparatus for controlling the size of a loop formed by a moving web of material and, more particularly, to a device including a drive control member having a diameter that can be increased or decreased in accordance with any change in the size of the loop, thereby maintaining the loop at its preset size.

The use of a loop of material which is maintained by continuous movement of the material so that intermittent motion of the material can also be effected is old in the art relating to photographic cameras, projectors and other apparatus used in the photographic field. Generally speaking, in the foregoing apparatus, a film loop is formed on each side of a film gate by continuously driven sprocket wheels. The intermittent motion of the film at the film gate is usually provided by a claw pulldown device or the like as is well known in the art. When the film loop becomes too large or too small, the film can be damaged by abrasion or by the strain placed on the perforations. For some time a device has been needed which will automatically control the length and size of a loop of material as it is moved into and/or withdrawn from a loop so that the web of material can be moved intermittently and any change in loop size will automatically and quickly be corrected by varying the rate of continuous movement of the web of material.

SUMMARY OF THE INVENTION

An object of the invention is to provide a device for automatically maintaining the size of a loop formed by a web of moving material.

Another object of this invention is to provide a loop control device that is highly responsive to small changes in the size of a loop of material.

Still another object of the invention is to provide a loop control device that can be operated with very low input forces.

Yet another object of the invention is to provide a loop control device that can operate without contacting a moving web of material.

And still a further object of the invention is to provide a loop control device that can be readily adapted to either perforated or nonperforated web formats.

These and other objects and advantages of the invention will be readily apparent to those skilled in the art by the description which follows.

The objects of the invention are attained by utilizing a drive control member or roller having a diameter that can be varied in accordance with any change in the size of a loop of material. The drive control member is fixed to and movable along a shaft that is driven at a constant angular velocity and is connected by means of a flat belt to a pulley on another shaft on which is mounted a first drive roller which cooperates with a second drive roller to advance the material at a generally constant linear speed, the material being engaged by the two drive rollers. A flapper amplifier that can sense any change in air pressure due to a change in a set spaced relation is arranged relative to the loop of material with its sensing orifice in spaced relation to one surface of the loop. The bellows portion of the flapper amplifier responds to any change in position of the loop relative to the orifice, thereby exerting an axial force which is translated to the drive control member. This axial force in the form of tension or compression causes a change in the effective diameter of the drive control member and therefore changes the linear speed of the flat belt. As a result, the speed of the drive rollers is changed to cause the web to be driven at a different linear speed until the normal spaced relation of the material relative to the sensing orifice of the flapper amplifier is restored.

DESCRIPTION OF THE DRAWINGS

Reference is now made to the accompanying drawings wherein like reference numerals designate like parts and wherein:

FIG. 1 is a simplified schematic drawing showing a loop control device constructed in accordance with the present invention and used in association with a motion picture pulldown mechanism;

FIG. 4 shows a plot of bellows pressure $P_b$ vs. distance of film from the sensing orifice, X, for the flapper or pneumatic amplifier used in the loop control device embodying the invention; and FIGS. 5–7 are simplified, schematic sectional views of the drive control member or roller showing its configuration under different operating conditions.

DESCRIPTION OF THE PREFERRED EMBODIMENT

Figure 2:
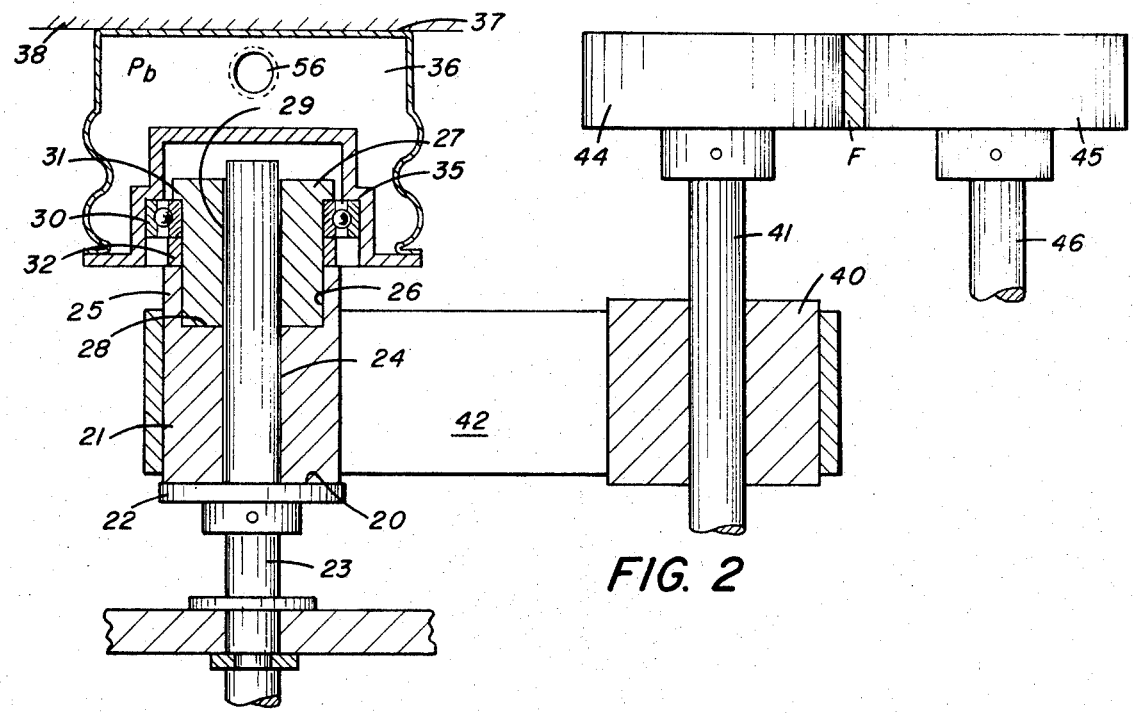
FIG. 2 is a sectional view taken substantially along the line 2—2 of FIG. 1, and showing the relationship between a drive control member or roller having a variable diameter and the film drive rollers of the loop control device embodying this invention.

Referring to FIG. 1, the invention is disclosed as being embodied in conjunction with a pulldown mechanism for a motion picture apparatus. However, it should be remembered that it is not to be limited to such use because it can be used with perforated or nonperforated materials, with porous or nonporous materials, with one or more loops of the material or with continuous and/or intermittent movement of the material. Pulldown mechanism 10 is arranged relative to a film gate 11 below and above which loops 13 and 12 are formed and maintained by a loop control device generally designated by the numeral 14. Mechanism 10 comprises a claw 15 that is reciprocated by a cam 16 which is rotated at a constant desired speed by any suitable spring or motor mechanism as is well known in the art.

The claw 15 describes a path necessary to properly engage a perforation along an edge of the film F and pull it down, thereby positioning the next frame in registry with the optical system and to be moved out of engagement with the film perforation at the end of the pulldown stroke. For a more detailed description of the pulldown mechanism described hereinabove, reference is made to U.S. Pat. No. 2,611,292, issued to J. S. Chandler on Sept. 23, 1952.

In FIG. 1 the size of loops 12 and 13 is shown as each being controlled by a device in accordance with the invention. However, the structure and function of the device is generally the same for either loop and the description will be directed primarily to device 14 that is associated with loop 12. In the present disclosure, the web of material or film F is driven at a generally constant linear speed to form loop 12. With respect t loop 13, however, the film F is withdrawn at a generally constant linear speed so as to maintain the loop size.

In the drive system shown in FIG. 2, facing surface 20 of an elastomer drive control member 21 is rigidly fastened by means well known in the art to a flange 22 on a drive shaft 23. Drive shaft 23 is driven at substantially constant angular velocity by a suitable drive means (not shown) and is suitably constrained so that it cannot translate in the direction of its axis. The inner bore 24 of drive control member 21 is a slip-fit over drive shaft 23 so that relative axial motion between bore 24 and drive shaft 23 is possible. The end 25 of drive control member 21 is provided with a circular recess 26 into which an end of sleeve 27 extends, the facing surface of the sleeve being attached by suitable means to the facing surface 28 of the recess. The inner diameter 29 of sleeve 27 is a slip-fit over shaft 23 such that sleeve 27 can have motion relative to drive shaft 23 in an axial direction. Radial ball bearing 30 is a press-fit over sleeve 27 and constrained axially in one direction by the lip 31 of sleeve 27 and in the other direction by sleeve 32 that is slid over sleeve 27. Ball bearing 30 is press-fit into member 35 which is attached to and forms a support for bellows 36. The surface 37 of bellows 36 is rigidly attached to a frame member 38, or a fixed surface so that surface 37 cannot have axial motion relative to drive shaft 23. Pulley 40 is rigidly attached to shaft 41 which is rotatably mounted in a fixed frame member (not shown). Flat belt 42 is wrapped around drive control member 21 and pulley 40 so that the rotation of drive shaft 23 and drive control member 21 is transferred to pulley 40 and shaft 41. Drive roller 44 is rigidly attached to an end of shaft 41 and rotates therewith. Another drive roller 45 is rigidly attached to an end of shaft 46 which can be mounted in the same frame member (not shown) as shaft 41. Drive rollers 44 and 45 are urged towards each other in any well known manner to pinch the film F so that it is advanced at a generally constant linear speed which depends upon the angular velocity of drive shaft 23 and the diameters of drive control member 21, pulley 40, and drive roller 44.

For a purpose to be described hereinafter, drive control member or roller 21 can be made of a solid elastomer material, such as natural rubber, neoprene, polyurethane, etc. The control member 21 can also be a hollow member of one of such materials and filled with a liquid or gas.

Figure 3:
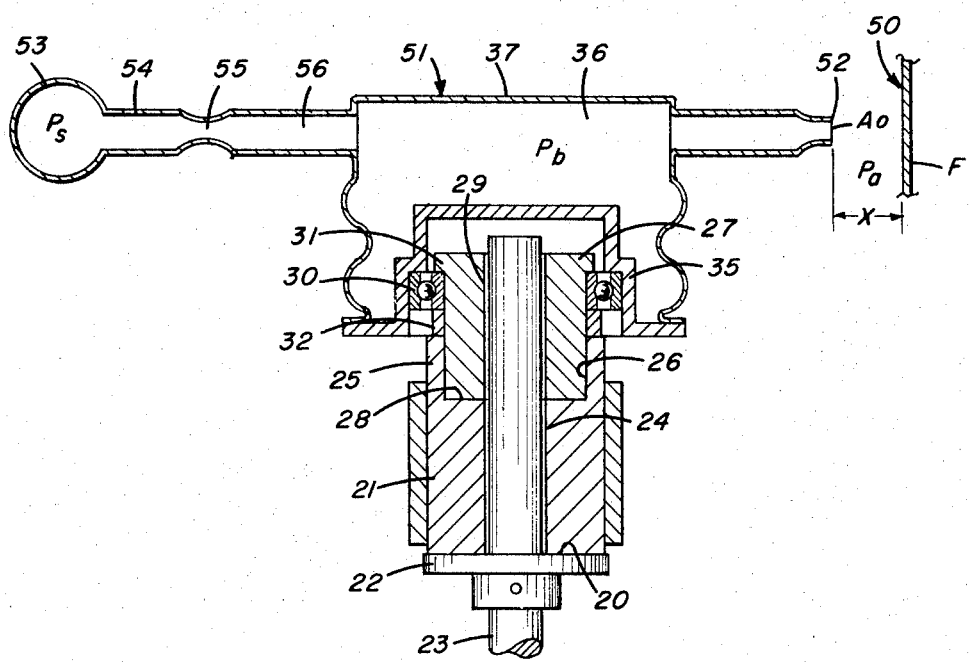
FIG. 3 is a sectional view taken substantially along the line 3—3 of FIG. 1, showing the relationship between a surface of film, the sensing orifice, and the drive control member having a variable diameter.

In order to control the size of loop 12, the invention contemplates having arranged relative to the loop and in spaced relation to a surface 50 of the film F, means for sensing any change in the set spaced relation. FIG. 3 shows a device well known in the art as a flapper amplifier, which is generally designated by the numeral 51. Sensing orifice 52 is located generally at a distance designated by X from film F or the web of material forming the loop. The area of orifice 52 is $A_o$, and the pressure existing there is $P_A$. Supply chamber 53 contains air or any other suitable gas at a supply pressure $P_s$. This air at pressure $P_s$ travels along line 54 and through fixed orifice 55. The air exiting from fixed orifice 55 passes through line 56 and into bellows 36. The pressure of the air in bellows 36 is designated by $P_b$. The pressure $P_b$ in bellows 36 is controlled by the position of surface 50 of film F relative to orifice 52. When the distance X approaches zero, film F is almost touching sensing orifice 52 so that the orifice is almost closed. The pressure $P_b$ in bellows 36 is then nearly equal to the supply pressure $P_s$. As the film F moves farther from sensing orifice 52, $P_b$ approaches the ambient pressure $P_a$. A typical graph of $P_b$ versus distance X (film F position) is shown in FIG. 4. For this loop control application, the operating range will be in the central, or linear portion of the graph.

As the size of loop 12 changes because the film is not being moved by claw 15 at the desired rate (too fast or too slow) or because it is not being fed in at the proper rate (too fast or too slow), it is desirable to have means responsive to such a change in the size of loop 12 for maintaining the loop at its preset size. Since the drive control member 21 is of an elastomer material, its diameter can be changed, thereby causing a continuous change in the linear speed of the film F until the loop attains its normal size. Such means for controlling the size of a loop of material can be best understood with reference to FIGS. 2 and 3. As the distance X changes, the pressure in the bellows 36 is altered according to the graph shown in FIG. 4. This change in bellows pressure $P_b$ causes a movement of member 35 in the direction of the axis of shaft 23. This axial motion of member 35 is transmitted through radial ball bearing 30 and sleeve 27 so that an axial force (tension or compression) is exerted upon elastomer drive control member 21. This axial force upon drive control member 21 changes its effective diameter, and, hence, causes the linear speed of belt 42 to either increase or decrease, depending upon whether the effective diameter of drive control member 21 was increased or decreased. As the linear velocity of belt 42 either increases or decreases, drive roller 44 is driven at either an increased or decreased angular velocity, respectively. Therefore, film F is driven at such increased or decreased velocity, thus affecting a change in loop size. FIG. 5 shows drive control member 21 when the surface 50 of film F is at a proper distance from sensing orifice 52 so as to maintain a loop of optimum size. For this case, the radius and length of drive control member 21 are designated by R and L, respectively.

If it is assumed that film loop 12 is becoming too short or small, see FIGS. 1, 3 and 6, the distance X between the surface 50 of film F and sensing orifice 52 decreases. The pressure $P_b$ in bellows 36 thus increases as shown by the relationship in FIG. 4. The increase in pressure $P_b$ thus causes bellows 36 to expand so that member 35 moves away from bellows 36 (downward as seen in FIGS. 3 and 6). Since radial ball bearing 30 is a press-fit into member 35, it moves therewith as well as sleeve 27 and drive control member 21 because facing surface 28 of sleeve 27 is secured to drive control member 21 which, in turn, is secured to flange 22 by its facing surface 20. As a result, drive control member 21 is placed in axial compression, see FIG. 6. The compression on member 21 causes its length L to decrease by $\Delta L$ and, hence, its effective radius increases by $\Delta R$. This increase in the diameter of member 21 causes belt 42 to be driven at a higher linear velocity. This change in linear velocity is translated through pulley 40 and roller 44 to film F so that the linear speed of film F is increased. This then causes film loop 12 to increase in size, thus giving the desired correction. This correcting condition is gradually reduced as the distance X increases. When the surface 50 reaches its normal position relative to orifice 52, the member 21 will also have returned to its normal dimensions (L and R).

Let us next assume that film loop 12 is becoming too long or too large. In this case, the distance X between the surface 50 of the film F and sensing orifice 52 increases. The pressure $P_b$ in bellows 36 thus decreases as shown by the relationship in FIG. 4. The decrease in $P_b$ thus causes member 35 to move toward or into bellows 36. As described above, the ball bearing 30, sleeve 27 and drive control member 21 move as a unit with member 35. In this case, the elastomer drive control member 21 is placed in axial tension. As a result, the length L of member 21 is increased by $\Delta L$ and, hence, its effective radius decreases by $\Delta R$, see FIG. 7. This causes belt 42 to be driven at a lower linear velocity since shaft 23 is driven at a constant angular velocity. This lower linear velocity is translated through pulley 40 and drive roller 44 to film F so that it is driven at a lower linear speed until the normal condition is reached; that is, the preset or predetermined distance X between surface 50 of film F and orifice 52.

While the above description of the invention has been directed to changes in the size of loop 12, it will be noted that for loop 13, the orifice 52 is arranged relative to the other surface of film F. In this case, if loop 13 is becoming too small, the distance X will increase and the film will be driven at a slower linear speed to permit the loop 13 to increase in size. On the other hand, the distance X will decrease as loop 13 increases in size, so the film F will then be driven at a higher linear speed. Consequently, a single unit can be used or a plurality of units can be arranged in tandem. In the latter case, however, each unit must be positioned relative to the side of the web of material that will produce a control in the proper direction for the condition being corrected.

Even though only small film takeup speed changes are possible (approximately ±2 percent), large loop position changes are possible. This is because of the time integrating effect that is obtained by having the small correcting increase or decrease in web velocity act over a long period of time.

Even though elastomer drive control member 21 is shown to be in a state of zero axial stress in the normal operating condition in the embodiment of the invention described hereinabove, it must be noted that it may be desirable under some circumstances to operate elastomer drive control member 21 with a bias compressive axial stress under a normal operating condition.

The invention has been described in detail with particular reference to a preferred embodiment thereof, but it will be understood that variations and modifications can be effected within the spirit and scope of the invention.

I claim:

1. A device for controlling the size of a loop formed by a web of material movable in a defined path, comprising:
   drive means for moving said web of material at a constant linear speed including a rotatable, drive control member that is axially movable for varying its effective diameter;
   sensing means normally responsive to air under a predetermined pressure, when arranged at a predetermined distance relative to a surface of said web of material forming said loop, for maintaining said loop at a normal operating size and movable in response to a change in said pressure effected by a sensed change in said predetermined distance;
   actuating means operatively connected to said drive control member and to said sensing means and responsive to movement of the latter for applying a force to said drive control member in an axial direction so as to vary the diameter thereof, whereby the linear speed of said web of material is varied in the necessary direction until said predetermined distance is reestablished.

2. A device in accordance with claim 1 wherein said drive control member is generally solid, elastomer roller.

3. A device in accordance with claim 1 wherein said sensing means comprises a bellows having an orifice positioned at said predetermined distance from said surface of said web of material and a member movable with said bellows in response to any change in air pressure in said bellows effected by the sensed change in said predetermined distance.

4. A device in accordance with claim 3 wherein said sensing means includes means for continuously supplying air under pressure to said bellows, said predetermined pressure being established within said bellows by the discharge of said air through said orifice when the latter is arranged at said predetermined distance relative to said surface of said web of material.

5. A device in accordance with claim 3 wherein said actuating means comprises an operating member coupled to said movable member and movable axially thereby relative to said drive control member for exerting one of a tensile and compressive force on said drive control member to vary the diameter thereof in accordance with the change in said predetermined distance.

6. A device in accordance with claim 5 wherein said operating member is moved in an axial direction to apply a tensile force to said drive control member when the sensed change is an increase in said predetermined distance.

7. A device in accordance with claim 5 wherein said operating member is moved in an axial direction to apply a compressive force to said drive control member when the sensed change is a decrease in said predetermined distance.

8. A device in accordance with claim 5 wherein said operating member is axially aligned and movable with said bellows and coupled to said movable member, whereby any movement of said bellows due to a change in said predetermined pressure is translated axially through said operating member and said movable member in one direction as a tensile force and in the other direction as a compressive force to vary the diameter of said drive control member.

* * * * *